United States Patent [19]

Kawada

[11] 3,941,200

[45] Mar. 2, 1976

[54] STEERING MEANS WITH POSITIVE STEERAGE FOR AUTOMOBILES

[76] Inventor: Tousuke Kawada, 10, Kamiebiike, Hitotsugicho, Kariya, Aichi, Japan

[22] Filed: July 25, 1974

[21] Appl. No.: 491,708

[30] Foreign Application Priority Data

July 27, 1973 Japan.................................. 48-85202

[52] U.S. Cl................................ 180/79.2 R; 91/381
[51] Int. Cl.²........................................... B62D 5/06
[58] Field of Search......... 180/79.2 R, 79.2 B, 79.3; 91/390, 381

[56] References Cited
UNITED STATES PATENTS

| | | | |
|---|---|---|---|
| 2,987,135 | 6/1961 | Harvey............................ | 180/79.2 D |
| 3,338,328 | 8/1967 | Cataldo........................... | 180/79.2 D |

Primary Examiner—Philip Goodman
Assistant Examiner—John A. Pekar
Attorney, Agent, or Firm—William A. Drucker

[57] ABSTRACT

A differential mechanism having two inputs independent of each other and an output is provided in an interconnecting mechanism for transmitting the rotaional angle of a handle to steered wheels. Also a transducing mechanism as a control system is provided which receives the speed of the automobile and the rotational angle of the handle as detected quantities and can control the deflection of the steered wheels after the operation by a driver so as to return the deflection to zero with a control speed dependent on the speed of the automobile. The steered wheels are operated by the output of the differential mechanism which receives the rotational angle of the handle and the output of the control system as its differential inputs.

7 Claims, 8 Drawing Figures

STEERING MEANS WITH POSITIVE STEERAGE FOR AUTOMOBILES

BACKGROUND OF THE INVENTION

This invention relates to a steering means for an automobile having positive steerage and more particularly to a steering means for an automobile in which the direction of the steered wheels are returned automatically to be along the longitudinal direction of the body of the automobile without returning the handle to its neutral position after the handle is rotated by any angle.

In a conventional steering means, the deflection of the steered wheels is proportional to the rotational angle of the handle whatever the speed of the automobile may be. Thus, if a driver operates the handle suddenly on feeling a necessity to change the direction of the automobile when it is running at a high speed, he can attain his purpose to change the direction of the automobile indeed. However, there occurs a problem that such secondary accidents as the slip and the lateral turning of the automobile occur because the centrifugal force becomes then very large on account of the high speed of the automobile. Of course this problem can be eliminated if the driver operating the handle keeps the rotational angle of the handle less at the high speed running of the automobile, feeling the speed of it even if a proportionality exists between the rotational angle of the handle and the deflection of the steered wheels. However, it will be impossible in practice to require the driver to assume such function especially in an instance and it is usual for such secondary accidents to occur as the result of the sudden operation of the handle carried out indiscreetly.

The object of the present invention is to provide a steering means in which the coupling between the handle and the steered wheels become more loose as the speed of the automobile is higher and the abrupt change itself of the running direction of the automobile is prevented at the high speed running, thereby the secondary accidents being avoided.

SUMMARY OF THE INVENTION

Between a handle and an interconnecting mechanism to transmit the rotation of the handle to steered wheels, a differential mechanism is provided whose one input is the rotational angle of the handle and the other input is the output of a transducing mechanism. This transducing mechanism is such a control system for giving the differential mechanism an operative output in which the running speed of the automobile and the deflection of the steered wheels with respect to the longitudinal direction of the body of the automobile are received as detected quantities, the setpoint of the deflection is adjusted to zero and the control speed to the zero setpoint is dependent on the running speed of the automobile. As in most differntial mechanisms, one of the inputs of this differntial mechanism, that is, the rotational angle of the handle and the other input, that is, the operative output of the transducing mechanism are independent of each other. Neither the output of the transducing mechanism is affected when the handle is rotated, nor the rotational angle of the handle is changed by the output of the differential mechanism. However, the operation due to the difference of both inputs is transmitted through the differential mechanism to the steered wheels. In a mechanism for detecting the speed of the automobile, a rectifying means is provided in order to detect the absolute value of the speed of the automobile whether it may move forward or backward. If there is a positive corelation between the control speed and the running speed of the automobile in this arrangement as described, the control speed of the deflection established by driver's handle operation to zero becomes larger as the automobile is driven at a higher speed and consequently the steered wheels are not so deflected at a higher speed as at a lower speed when the driver rotates the handle by a certain angle. In other words, this effect is equivalent to decrease the substantial coupling between the handle and the steered wheels and more accurately to increase the diameter of the handle at the high speed running if the peripheral speed of the driver's hand is constant.

The salient relationships of the present invention have been described and it will be understood that with the steering means according to the present invention, the driver can operate the handle to establish the deflection of the steered wheels at the low speed running as with the conventional steering means but he can operate the handle only to change the direction of the steered wheels very slightly at the high speed running. Thus, the abrupt change itself of the direction of the steered wheels is impossible and the secondary accidents such as the slip and the lateral turning of the automobile as described are prevented which would occur if the steered wheels are deflected abruptly by the handle operation. The other features of the present invention will become clear from the following detailed description taken in conjunction with drawings and from the accompanying claims.

IN THE DRAWINGS

Figure 1:
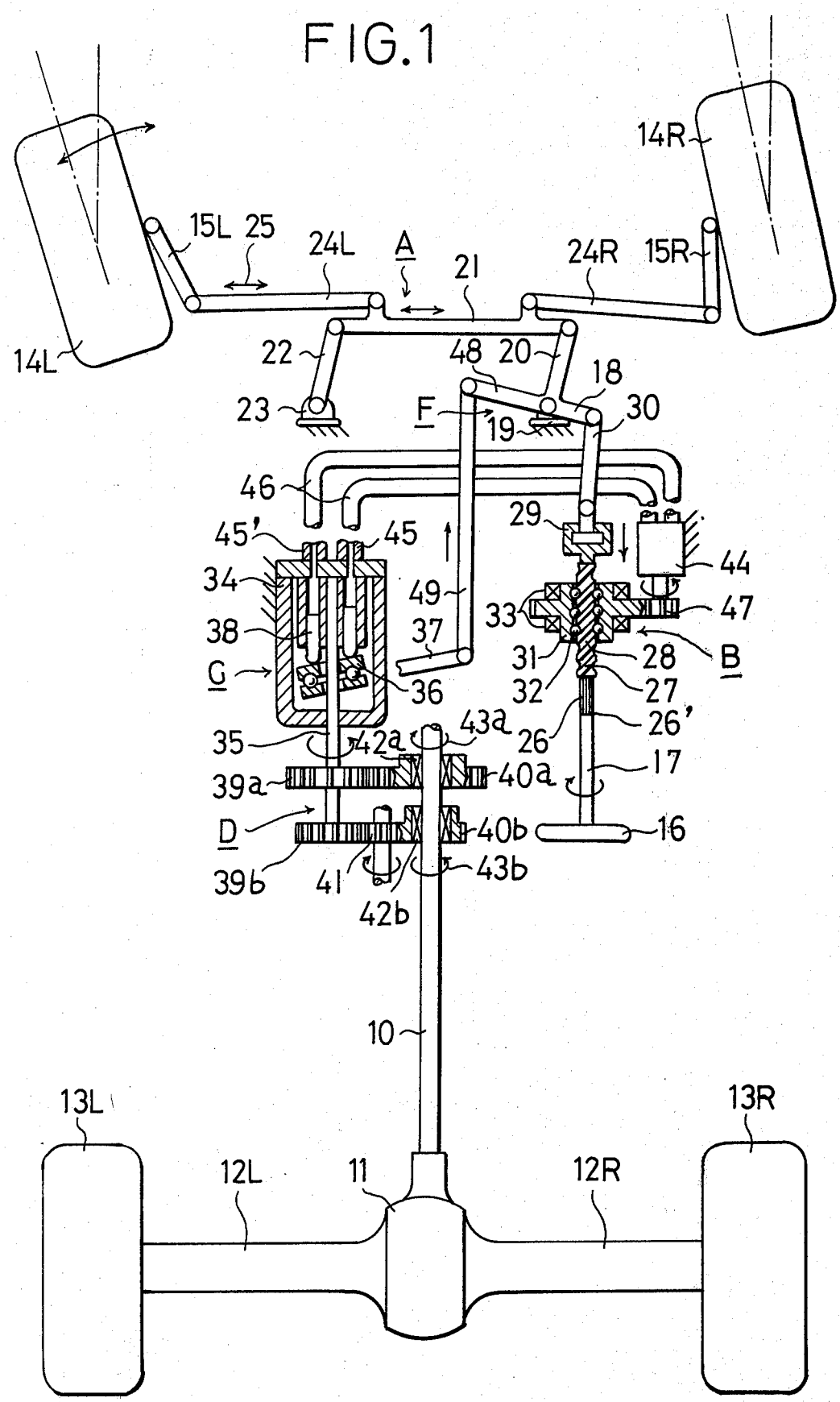
FIG. 1 is a plane view in partial section of a steering means.

Referring to FIG. 1, a propeller shaft 10 is connected to an internal combustion engine through a transmission, a clutch and so on (not shown) as is well known. The rear end of the propeller shaft 10 is connected to a differential gear 11 which can actuate a pair or rear axles 12L and 12R not only at equal but also different speeds. The reference letter L refers to the left hand one of a pair of members such as wheels and the letter R to the right hand one. These letters are omitted usually except in the case when the discrimination between the left hand and the right hand members is necessary. Rear wheels 13 are driven from the rear axle 12 but front wheels may be driven in some cases depending on types of automobiles. Front wheels 14 as steered wheels are engaged with one end of a knuckle arm 15 for rotation. The steered wheels may be rear wheels depending on the types of automobiles. A handle 16 is provided so that it can change the direction of the steered wheels 14 in cooperation with an interconnecting mechanism A. In the interconnecting mechanism A, a handle shaft 17 is connected to the handle 16 at its one end for rotation with the same. A handle lever 18 is mounted for swinging motion on a fulcrum bracket 19 fixed on the body of the automobile and is interconnected with the handle 16 through a differential mechanism B to be described below. A pitman arm 20 is connected fixedly to the handle lever 18, one end of a connecting rod 21 is pivoted on the pitman arm 20 and an idler arm 22 supporting the other end of the connecting rod 21 is pivoted for free swinging motion on a fulcrum bracket 23 fixed on the body of the automobile. One end of a tie rod 24 is connected pivotally to the connecting rod 21 at its one end and to the other end of the knuckle arm 15 at its other end so that the tie rod 24 may displace along an arrow 25.

Next, the differential mechanism B is described. A spline axis 26 is formed integral with the other end of the handle shaft 17. A tubular helical member 27 has axial grooves on its inner surface and a helical groove 28 on its outer surface. The helical member 27 engages the spline axis 26 at the axial grooves 26' so that the helical member can slide axially on but not rotate relative to the spline axis 26. A joint 29 such as a thrust bearing connects the other end of the spline axis 26 with one end of a connectng rod 30 which is provided on the handle lever 18 of the interconnecting mechanism A. A toothed apertured rotable member 31 is disposed coaxially with the helical member 27 and has several circular grooves on its inner surface. Balls 32 are adapted partly in the helical groove 28 and partly in the circular grooves of the rotable member. A pair of bearings 33 are provided in order to make possible the rotation but neither the thrust nor the radial motion of the rotable member 31. Thus, when the spline axis 26 is rotated together with the handle shaft 17, the spline axis thrusts and the rotable member rotates. On the other hand, when the rotable member is rotated positively, the spline axis thrusts without rotating.

Next, a transducing mechanism C is described. A well known variable capacity axial plunger pump 34 of the swash-plate type can increase its discharge as the rotational speed of its shaft 35 and the inclination angle of a swash plate with respect to the shaft 35 increases and the direction of the discharge is reversed when the plate 36 is inclined oppositely. An angle lever 37 connected to the swash plate 36 forms the control terminal of the transducing mechanism C as a control system. Two plungers 38 are arranged around the shaft 35 and are biased to the swash plate 36 by a spring. An oil motor 44 is connected to the inlet 45 and the outlet 45' of the plunger pump 34 by pipings 46. As is well known, this oil motor 44 is adapted to rotate at a higher speed as the speed of oil flow to it increases and to rotate oppositely in those cases when the direction of the flowing oil is reversed. An output gear 47 is mounted on the shaft of the oil motor 44 and is in mesh with the toothed rotable member 31 of the differential mechanism B as the output terminal of the transducing mechanism C. A speed-detecting mechanism D comprises a pair of gears 39a and 39b mounted on the shaft 35, another pair of gears 40a and 40b in mesh directly with the gear 39a and with an idler gear 41 respectively and a pair of unidirectional clutches 42a and 42b interposed between the propeller shaft 10 and the gear 40a and between the former and the gear 406 respectively. These unidirectional clutches are adapted to transmit the rotation of the propeller shaft 10 in the direction indicated by associated arrows 43a and 43b respectively and thus to rotate the shaft 35 of the plunger pump 34 only in one direction regardless of the rotational direction of the propeller shaft 10. This speed-detecting mechanism D has a rectifying function for the rotational direction of the rear wheels 13. A deflection-detecting mechanism F comprises a detecting lever 48 formed integrally with the pitman arm 20 and a connecting rod 49 connecting the angle lever 37 with the detecting lever 48.

Figure 7:
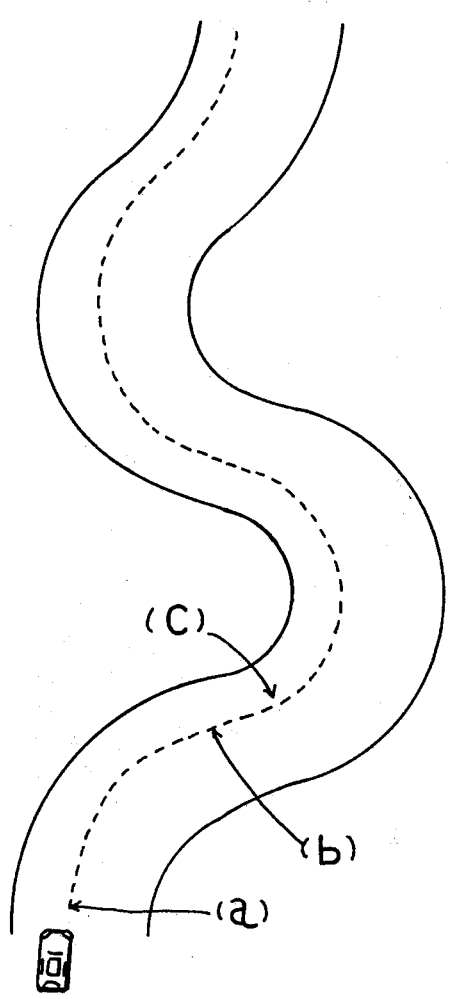
FIGS. 7 and 8 are plane views for showing the positions and the loci of a running automobile.
Figure 8:
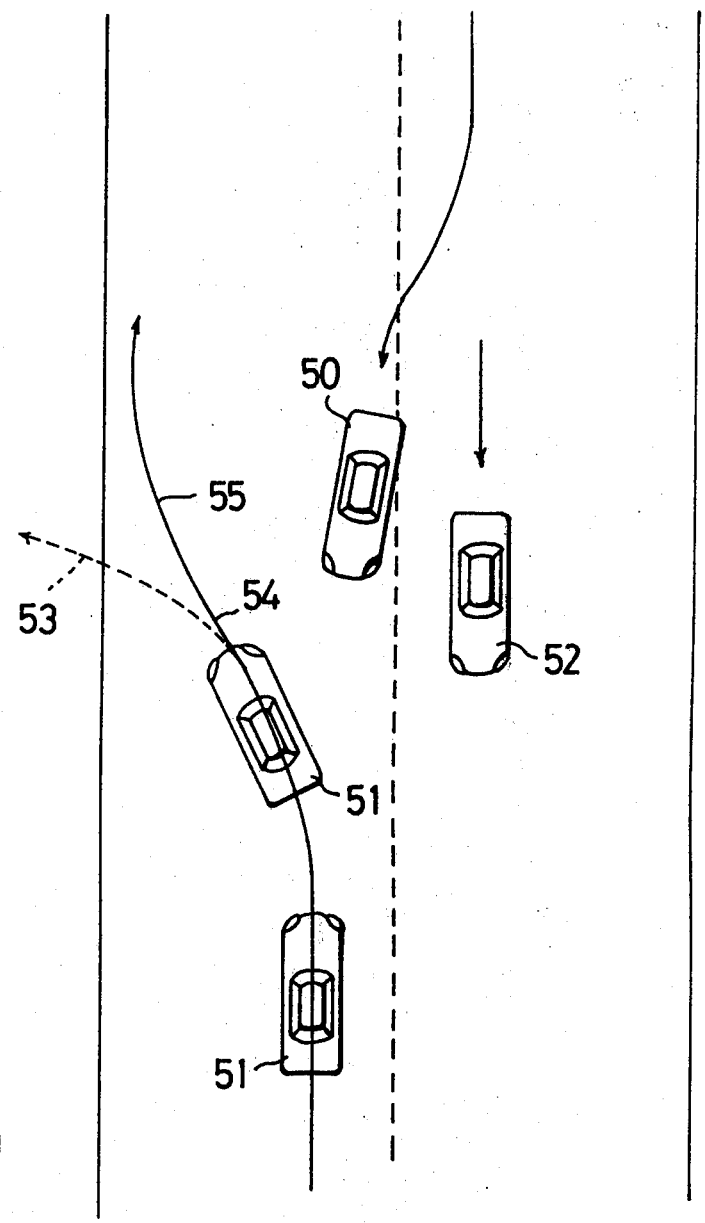

The operation of the steering means just described is as follows. As an example, the description is taken for the case where an automobile is turning to the left. When the handle 16 is rotated to the left, that is, counterclockwise, it actuates the helical member 27 in the same direction through the handle shaft 17 and the spline axis 26. On the other hand, the toothed rotable member 31 is engaged with the helical member 27 through balls 32 but is prevented from rotating because it is connected to the oil motor 44 through the output gear 47. Thus, the helical member 27 moves axially, too. This axial movement is transmitted through the connecting rod 30 and the interconnecting mechanism A to the steered wheels and they are deflected to the left. On the other hand, this operation to deflect the steered wheels is transmitted to the angle lever 37 of the plunger pump 34 through the detecting lever 48 and the connecting bar 49 and the swash plate 36 is inclined. Then, the plunger pump 34 discharges some oil, which flows in the piping 46 to rotate the oil motor 44 and further to rotate the toothed rotable member 31 through the gear 47. The rotational direction of this rotable member 31 is that of the helical member 27 actuated by the handle, that is such that the helical member 27 is returned to its position before actuation, i.e., away from the handle and the deflection of the steered wheels 14 is removed as the result of the returning movements of the connecting rod 30 and the interconnecting mechanism A. Accordingly, the automobile is controlled automatically to move linearly even if the handle is held at its position rotated. Because the speed-detecting mechanism has a function to rectify the rotational direction of the propeller shaft 10 and the plunger pump 34 is actuated always in one direction by the propeller shaft, the automatic removal of the deflection of the steered wheels can be effectuated equally well when the automobile runs either forward or backward. As the speed of the control to return the deflection of the steered wheels to zero increases with the rotational speed of the propeller shaft with which the shaft 35 is engaged, the less is the effective deflection of the steered wheels, the higher does become the running speed of the automobile, if the handle is operated with a constant peripheral speed. Thus, the handle operation becomes less sharp at the high speed running. Next, the handle operation for an automobile running on a real road is described. Assume that an automobile provided with the steering means according to the present invention is coming to a point (a) on the road as shown in FIG. 7. The driver of this automobile continues to rotate the handle to the right until he stops the handle operation at point (b) and the steered wheels are then returned automatically to their direction for linear running. Thus, he will be able to carry out the operation with composure in order to turn the automobile to the left when it comes to a point (c). When an automobile 50 countering an automobile 51 is running beyond a center line in order to outrun another automobile 52 as shown in FIG. 8, the driver of the automobile 51 rotates the handle 16 to the left hand to avoid a collision. with the conventional steering means, the collision would be avoided indeed but the automobile would run away from the road in the direction shown by an arrow 53 in most cases because the driver has no time sufficient to return the rotated handle to its neutral position in an instance and the automobile continues to curve. However, the automobile 51 having the present steering means is returned to its direction for linear running as shown by an arrow 54 with the handle at its rotated position and there will be time and distance to spare till the automobile runs away from the road. Thus, the driver can change the running direction of the automobile as shown by an arrow 55 with safety.

Figure 2:
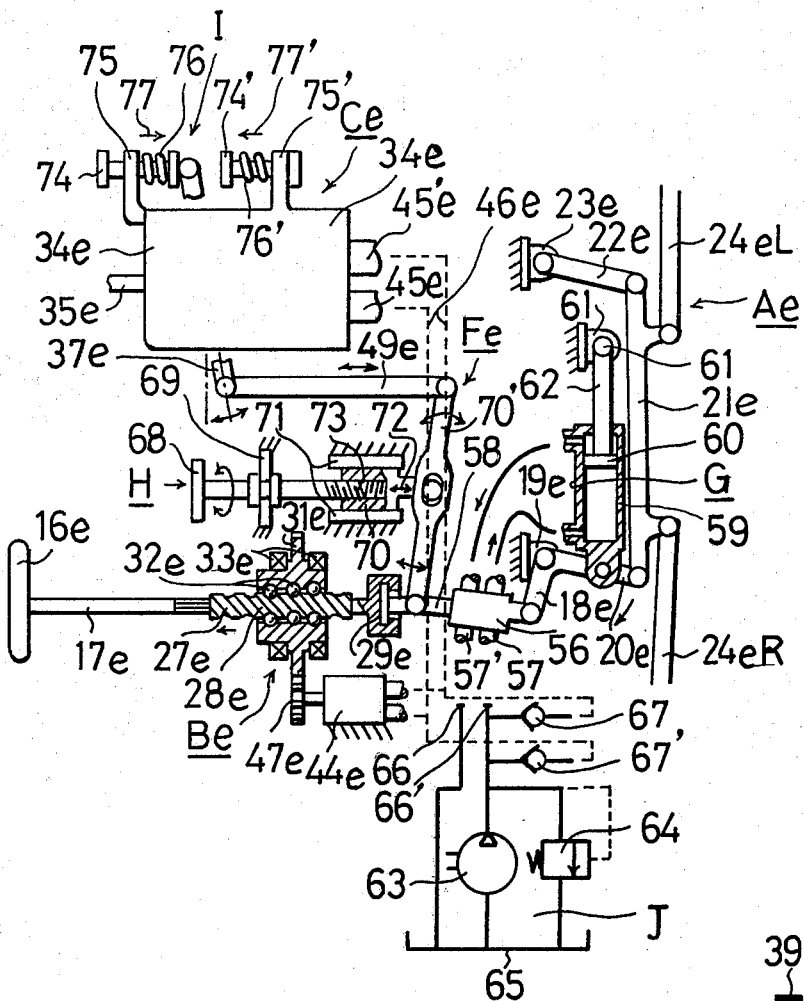
FIG. 2 is a plane view in partial section of the steering means in FIG. 1 provided with additional means.

Next, another embodiment with some additional means is described. These members in this and the following embodiments which are functionally or constructionally similar to or identical with those in the first embodiment are referred to by the same reference numerals but with alphabets such as $e$, $f$ and so on to distinguish members for different embodiments. Referring to FIG. 2, this embodiment includes a hydraulic amplifying means G, a neutral point adjusting means H and a neutral point restoring means I for the angle lever 37$e$. In this amplifying means G, a control valve 56 comprises an oil inlet 57 and an oil outlet 57' and a spur 58 connected to the joint 29$e$. A hydraulic cylinder 59 is supported pivotally on the handle lever 18$e$ and a piston 60 slidable in the cylinder 59 is connected pivotally to a bracket 61 mounted on the body of the automobile by a piston rod 62. A hydraulic unit J for actuating the amplifying means G comprises a hydraulic pump 63 adapted to be operated from the engine of the automobile, a relief valve 64 to limit the pressure of the pump 63 within a certain limit, a hydraulic tank 65 and an oil inlet 66' and an outlet 66' connected to the oil outlet 57' and the oil inlet 57 of the amplifying means G respectively. A pair of check valves 67 and 67' are piped as shown in order to remove voids in the pipings 46$e$ of the transducing mechanism C$e$. In the neutral point adjusting means I, an adjusting handle 68 is supported on a bearing 69 only for rotation relative to the body of the automobile. A slider 70 is supported in a guide for the linear motion in the direction shown by an arrow 72 and is engaged with a screw 73 attached to the end portion of the handle 68 so that the slider may reciprocate as the handle 68 is rotated. This adjusting means is set by turning the handle 68 in such a manner that the discharge of the plunger pump 34$e$ is zero, that is, the rotation of the gear 47$e$ as the output of the transducing mechanism C$e$ is not established when the steered wheels are right in the direction for linear running. In the neutral point restoring means I, a pair of confronting pistons 74 and 74' are passed through supporting pieces 75 and 75' projecting from the cylinder block of the plunger pump 34$e$ respectively and either of them is adapted to be in contact with the angle lever 37$e$ of the plunger pump 34$e$. A pair of springs 76 and 76' are provided so as to bias the pistons in the directions shown by arrows 77 and 77' respectively for the purpose of returning the angle lever 37$e$, to its neutral position. A connecting lever 70' is connected pivotally at its one end to a connecting bar 49$e$. This connecting lever is pivoted at the other end on the spur 58 and engages pivotally at its intermediate portion with the slider 70.

Figure 3:
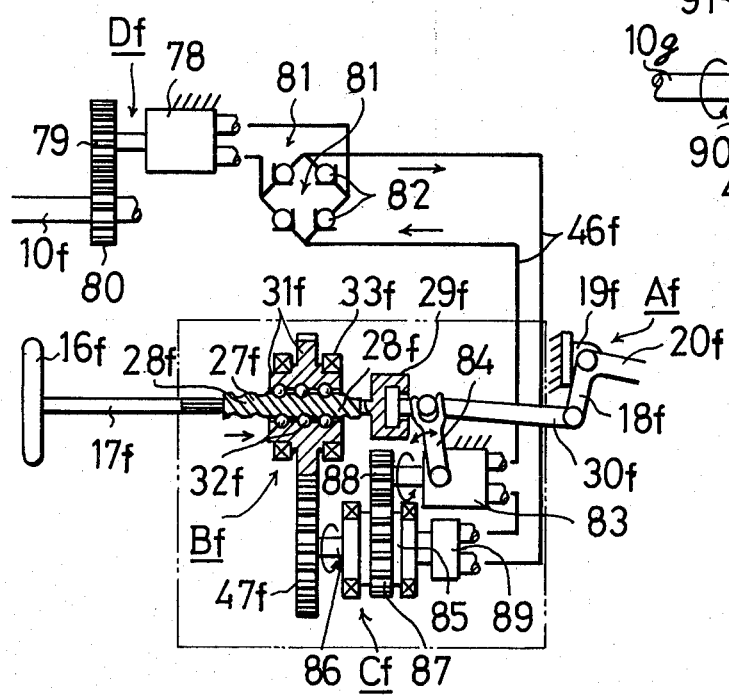
FIG. 3 is a plane view in partial section of another embodiment of the steering means different in the transducing mechanism.

A still another embodiment is described in which a different transducing mechanism and a different speed-detecting mechanism are used. Referring to FIG. 3, a speed-detecting mechanism D$f$ includes an oil pump 78 having a shaft engaged with a propeller shaft 10$f$ gears 79 and 80. A hydraulic rectifying circuit 81 comprises four check valves 82 connected in a bridge. This hydraulic rectifying circuit is for making unidirectional the oilflow to an oil motor 83 of variable capacity type regardless of the rotational direction of the propeller shaft 10$f$ and of the oil pump 78. The oil motor 83 is provided with a capacity adjusting lever 84 whose movement leads to the variation in the rotational speed of the motor 84. This lever is connected to the joint 29$f$ to form the control terminal of the transducing mechanism C$f$. An oil motor 85 has its shaft 86 and a gear 87 mounted thereon. This gear 87 is in mesh with a gear 88 mounted on the shaft of the oil motor 83 and thus oil motors 83 and 85 can be operated differentially. An output gear 47$f$ mounted on the shaft 86 of the motor 85 is in mesh with the rotable member 31$f$ as an output terminal of the differentially connected motors 83 and 85. A rotary joint 89 is provided on the motor 85 in order to feed oil to this rotating motor. The oil motors 83 and 85 are connected in series with each other and with the hydraulic rectifying circuit 81 by pipings 46$f$. The capacities of the oil motors 83 and 85 and the gear ratio between gears 87 and 88 are so determined that the output gear 47$f$ does not rotate when the steered wheels are in the direction for linear running.

The operation of the embodiment just described is as follows. When the lever 84 is displaced by operating the handle 16$f$, the capacity of the oil motor 83 is changed. Then, the gear 47$f$ begins to rotate because of the variation in the ratio of the rotational mumbers of the motors 83 and 85. The rotation of this gear 47$f$ is transmitted to the lever 84 through the differential mechanism B$f$ and further to the steered wheels 14$f$ through the interconnecting mechanism A$f$. These movements have a tendency to return the steered wheels to their direction for linear running, i.e., to remove the displacement of the lever 86.

Figure 4:
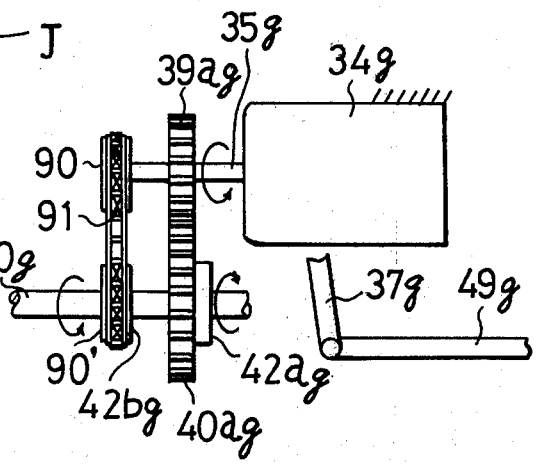
FIGS. 4 and 5 are plane views showing another embodiment of the rectifying means for the rotational direction of the drived wheels of an automobile.
Figure 5:
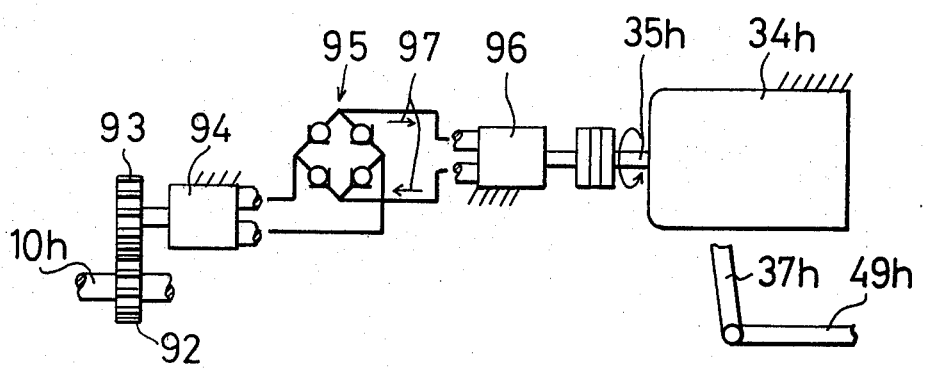

Referring to FIGS. 4 and 5, still two embodiments are described in which the hydraulic rectifying circuit is formed differently. FIG. 4 shows an embodiment in which gears 90 and 90' corresponding to the gears 39$b$ and 40$b$ of the first embodiment in FIG. 1 are connected by a chain wheel 91 and the idler gear 41 is replaced by this chain wheel. According to this construction, the shaft for the idler gear 41 is not necessary. In FIG. 5, a gear 92 mounted on the propeller shaft 10$h$ is in mesh with a gear 93 mounted on the shaft of an oil pump 94. A hydraulic rectifying circuit 95 comprising four check valves connected in a bridge is interposed between the oil pump 94 and an oil motor 96 in order to rectify the oilflow from the oil pump 94 in the direction shown by an arrow 97. Thus, the direction of the oilflow to the motor 96 is always this direction and the pump 34$h$ can rotate in the same direction regardless of the rotational direction of the propeller shaft 10$h$.

Figure 6:
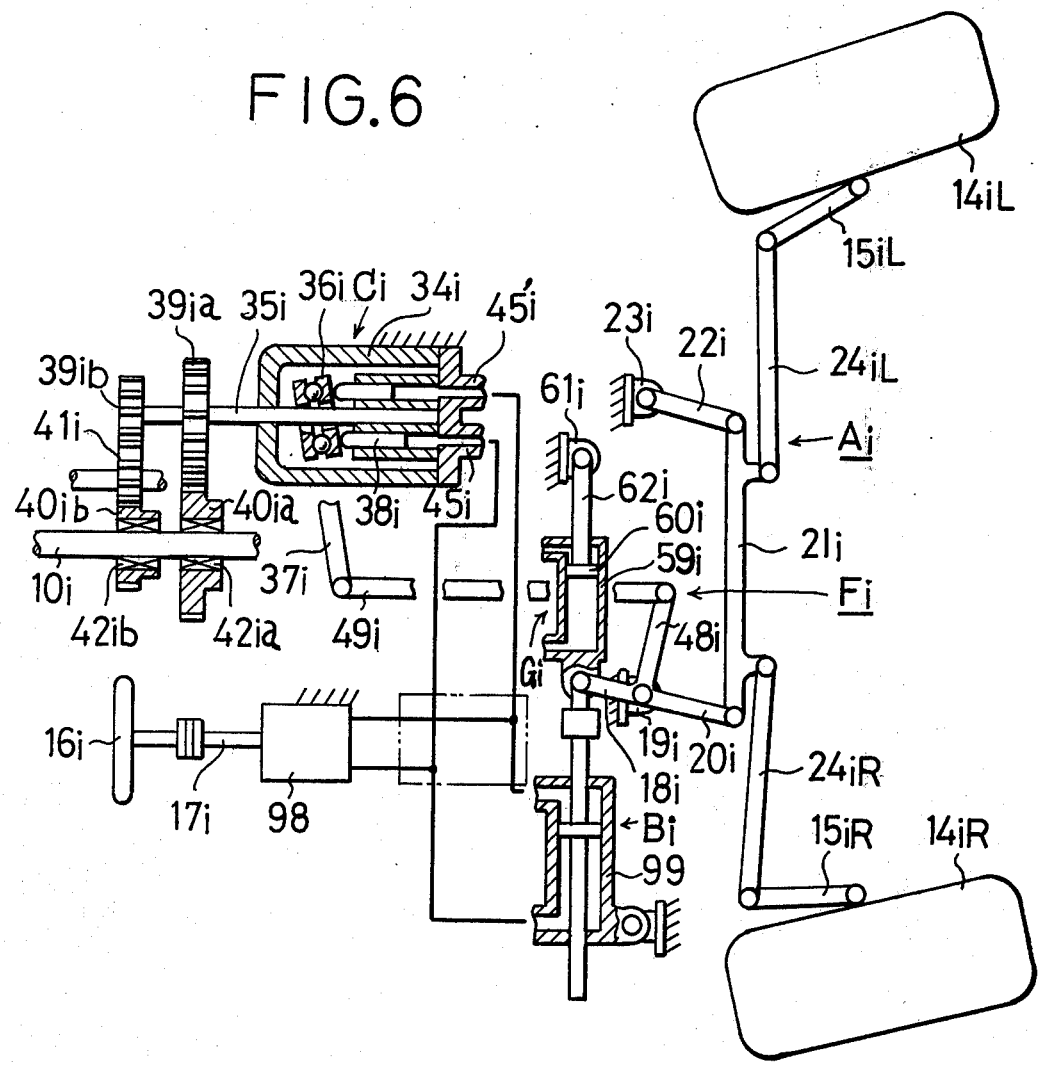
FIG. 6 is a plane view of a still another embodiment of the steering means.

Refering to FIG. 6, the last embodiment is described. In this embodiment, the handle shaft 17$i$ is engaged directly with and oil pump 98. This oil pump 98 and an axial plunger pump 34$i$ as a transducing mechanism are connected in parallel to a hydraulic cylinder 99 as a differential mechanism. The output of the differntial mechanism is connected to the interconnecting mechanism through a hydraulic amplifying means G*i*. According to this construction, the position for installing the handle can be selected with considerable arbitrariness and so the steering means of the present invention becomes convenient to install when it is applied to such special automobiles as tractors and bulldozers.

What I claim is:

1. In an automobile having steered wheels engaged with a handle or steering wheel through an interconnecting mechanism so as to be deflected by operating the handle, a steering means comprising a differential mechanism having an output and two inputs independent of each other, said differential mechanism being interposed in said interconnecting mechanism, a deflection-detecting mechanism having an angle lever actuated by said interconnecting mechanism to detect the deflection of the steered wheels relative to the longitudinal direction of the body of the automobile, a speed-detecting mechanism to detect the running speed of the automobile regardless of the forward and the backward movement of the automobile, a transducing mechanism as a control system having two inputs and an output, one of said inputs being connected with said deflection-detecting mechanism, the other with said speed-detecting mechanism, indication of the rotational angle of said handle being supplied to one of the inputs of said differential mechanism and the output of said transducing mechanism being supplied to the other input of said differential mechanism to control the deflection of the steered wheels, and the steered wheels being returned to in the longitudinal direction of the body of the automobile by the output of said differential mechanism with a positive correlation such that the control speed of the deflection to its setpoint increases with the increasing output of said transducing mechanism in response to the increasing speed of the automobile and without any operation to return the handle after the steered wheels are deflected by operating the handle.

2. A steering means as described in claim 1 in which said differential mechanism comprises a spline axis formed integrally with the shaft of said handle, said spline axis having axial grooves, a tubular helical member having axial grooves engageable with said axial grooves of said spline axis on an inner surface and a helical groove on an outer surface, an apertured rotatable member rotatable around said helical member without being displaced axially, said rotable member having circular grooves on an inner surface and balls set partly in said helical grooves and partly in said circular grooves.

3. A steering means as described in claim 1 in which said transducing mechanism comprises an axial plunger pump for detecting the deflection of the steered wheels relative to the longitudinal direction of the body of the automobile an oil motor in communication with said plunger pump and actuated by the same and an output gear mounted on the shaft of said oil motor and engaged with one of the inputs of said differential mechanism.

4. A steering mechanism described in claim 1 in which said speed-detecting mechanism comprises a first pair of gears mounted on a common shaft, a second pair of gears, one of said first pair of gears being in mesh with one of said second pair of gears, an idler gear in mesh with said two pairs of gears and a pair of unidirectional clutches engaged with one and the other of said second pair of gears respectively.

5. A steering means as described in claim 1 in which said speed-detecting mechanism comprises an oil pump actuated by the automobile and having a positive correlation so that the flow rate of oil through said oil pump increases with the increasing speed of said automobile, a hydraulic rectifying circuit having check valves connected in a bridge and an oil motor actuated by said oil pump through said hydraulic rectifying circuit.

6. In an automobile having steered wheels engaged with a handle or steering wheel through an interconnecting mechanism, a steering means comprising a differential mechanism having an output and two inputs independent of each other, said differential mechanism being interposed in said interconnecting mechanism, an oil pump actuated by the automobile and having a positive correlation so that the flow rate of oil through said oil pump increases with increasing speed of said automobile, a constant capacity oil motor, a variable capacity oil motor provided with capacity-adjusting means, said oil motors being coupled differentially, a hydraulic rectifying circuit, the output of said oil pump being connected to the inputs of said oil motors through said hydraulic rectifying circuit, the capacity-adjusting means being actuated by said interconnecting mechanism having a swash plate, said swash plate connected with said angle lever, indication of the rotational angle of the handle being supplied to one of the inputs of said differential mechanism, the output of said differentially coupled oil motors being supplied to the other input of said differential mechanism, and the steered wheels being returned to run in the longitudinal direction of the body of the automobile by the output of said differential mechanism without operations to return the handle after the steered wheels are deflected by operating the handle.

7. In an automobile having steered wheels engaged with a handle or steering wheel through an interconnecting mechanism so as to be deflected by operating the handle, a steering means comprising a differential mechanism having an output and two inputs independent of each other, the output of said differential mechanism being connected to said interconnecting mechanism, an oil pump actuated by said handle, a deflection-detecting mechanism having an angle lever actuated by said interconnecting mechanism to detect the deflection of the steered wheels relative to the longitudinal direction of the body of the automobile, a transducing mechanism control system having two inputs and an output, one of said inputs being connected with said defelction-detecting mechanism, a speed-detecting mechanism comprising gear and clutch means actuated from the automobile to detect the running speed of the automobile regardless of the forward and the backward movement of the automobile, the other input of said transducting mechanism being connected to said speed-detecting mechanism, indication of the output of said oil pump being supplied to one of said inputs of the differential mechanism and the output of said transducing mechanism being supplied to the other input of said differential mechanism to control the deflection of the steered wheels, the setpoint of the deflection of the steered wheels in said transducing mechanism being adjusted to zero and the steered wheels being returned the longitudinal direction of the body of the automobile by the output of said differential mechanism with a positive correlation such that the control speed of the deflection to its setpoint increases with the increasing output of said transducing mechanism due to the increasing speed of the automobile and without any operation to return the handle after the steered wheels are deflected by operating the handle or steering wheel.

* * * * *